US010640702B2

(12) United States Patent
Hudson et al.

(10) Patent No.: US 10,640,702 B2
(45) Date of Patent: May 5, 2020

(54) COATED PARTICLES AND METHODS FOR THEIR MANUFACTURE AND USE

(71) Applicant: Bayer MaterialScience LLC, Pittsburgh, PA (US)

(72) Inventors: Kevan Hudson, Clinton, PA (US); Jeffrey F. Dormish, Upper St. Clair, PA (US); Michael K. Jeffries, Follansbee, WV (US)

(73) Assignee: Covestro LLC, Pittsburgh, PA (US)

( * ) Notice: Subject to any disclaimer, the term of this patent is extended or adjusted under 35 U.S.C. 154(b) by 1040 days.

(21) Appl. No.: 13/956,532

(22) Filed: Aug. 1, 2013

(65) Prior Publication Data

US 2015/0034314 A1     Feb. 5, 2015

(51) Int. Cl.
| | | |
|---|---|---|
| *B05D 3/00* | (2006.01) | |
| *C09K 8/80* | (2006.01) | |
| *C08G 18/75* | (2006.01) | |
| *C09D 175/04* | (2006.01) | |
| *C08G 18/66* | (2006.01) | |
| *C08G 18/72* | (2006.01) | |
| *C08G 18/73* | (2006.01) | |
| *C08G 18/42* | (2006.01) | |
| *C08G 18/08* | (2006.01) | |

(52) U.S. Cl.
CPC .......... *C09K 8/805* (2013.01); *C08G 18/0828* (2013.01); *C08G 18/4202* (2013.01); *C08G 18/4238* (2013.01); *C08G 18/664* (2013.01); *C08G 18/722* (2013.01); *C08G 18/73* (2013.01); *C08G 18/755* (2013.01); *C09D 175/04* (2013.01)

(58) Field of Classification Search
CPC ..... A63B 37/0058; C08L 75/04; C08L 75/06; C09D 175/04; C09D 175/14; A61K 8/11; A61K 8/87; C09J 175/04; C09J 163/00; C09J 175/14; C09J 2475/00; Y10T 428/24372; Y10T 428/2443; C08F 290/067; C09K 8/805; C08G 18/664; C08G 18/722; C08G 18/73; C08G 18/755; C08G 18/0828; C08G 18/4202; C08G 18/4238; C08G 18/12; C08G 18/3857; C08G 18/289
USPC ............ 166/276, 281; 428/402–402.24, 403, 428/404, 407, 321.1, 474.4; 427/331, 427/389.9, 212, 213–213.36, 483, 256; 264/534, 5, 41, 4–4.7; 424/400, 408, 424/450, 451, 455, 93.7, 184.1, 497, 489, 424/501, 490, 491, 492, 493, 494, 495
See application file for complete search history.

(56) References Cited

U.S. PATENT DOCUMENTS

| | | | |
|---|---|---|---|
| 3,479,310 A | | 11/1969 | Dieterich et al. |
| 3,886,226 A | * | 5/1975 | Asai ...................... C08G 18/12 |
| | | | 528/28 |
| 4,108,814 A | | 8/1978 | Reiff et al. |
| 4,374,237 A | | 2/1983 | Berger et al. |
| 4,687,533 A | | 8/1987 | Rizk et al. |
| 4,920,192 A | | 4/1990 | Wiser-Halladay |
| 5,048,608 A | | 9/1991 | Wiser-Halladay et al. |
| 5,124,400 A | | 6/1992 | Tirpak et al. |
| 5,199,491 A | | 4/1993 | Kutta et al. |
| 5,252,696 A | | 10/1993 | Laas et al. |
| 5,256,729 A | | 10/1993 | Kutta et al. |
| 5,432,228 A | | 7/1995 | Hilken et al. |
| 6,046,295 A | * | 4/2000 | Frisch, Jr. .......... C08G 18/0804 |
| | | | 528/28 |
| 6,057,415 A | * | 5/2000 | Roesler ................ C08G 18/289 |
| | | | 528/28 |
| 6,111,010 A | * | 8/2000 | Yu ........................ C08G 18/289 |
| | | | 524/588 |
| 6,426,414 B1 | | 7/2002 | Laas et al. |
| 6,705,400 B1 | | 3/2004 | Barton |
| 6,749,943 B1 | | 6/2004 | Tangen et al. |
| 6,756,456 B2 | | 6/2004 | Sauterey et al. |
| 6,762,241 B1 | * | 7/2004 | Blum .................... C08G 18/10 |
| | | | 428/294.7 |
| 7,767,737 B2 | | 8/2010 | Musch |
| 8,431,674 B2 | | 4/2013 | Ludewig |
| 8,770,294 B2 | | 7/2014 | Tanguay |
| 8,846,198 B2 | | 9/2014 | Wolfgang |
| 9,879,515 B2 | | 1/2018 | Green et al. |
| 2002/0002232 A1 | * | 1/2002 | Sagiv ...................... C08L 75/06 |
| | | | 524/501 |
| 2003/0119976 A1 | | 6/2003 | Ganster |
| 2003/0139509 A1 | * | 7/2003 | Onder ................ C08G 18/0895 |
| | | | 524/379 |
| 2004/0142826 A1 | | 7/2004 | Nguyen |
| 2005/0053794 A1 | | 3/2005 | Liu |
| 2005/0131109 A1 | * | 6/2005 | Arndt ................... C08G 18/706 |
| | | | 523/334 |
| 2005/0274517 A1 | * | 12/2005 | Blauch .................... C09K 8/62 |
| | | | 166/280.2 |
| 2006/0046068 A1 | | 3/2006 | Barancyk et al. |

(Continued)

OTHER PUBLICATIONS

Biofuels at Journey to Forever, Mesh to Micron Conversion Chart, Nov. 2005.*

*Primary Examiner* — Irina S Zemel

(74) *Attorney, Agent, or Firm* — Jed C. Benson; Richard P. Bender; Donald P. Palladino

(57) ABSTRACT

Disclosed are coated particles, such as proppants, processes for their preparation and methods for using such particles, such as in a hydraulic fracturing process. The coated particles include a coating that includes a crystalline or semi-crystalline polyester/polyurethane having a decrystallization temperature of at least 35° C.

10 Claims, No Drawings

(56) References Cited

U.S. PATENT DOCUMENTS

| | | | |
|---|---|---|---|
| 2006/0065397 A1* | 3/2006 | Nguyen | C09K 8/68 |
| | | | 166/280.1 |
| 2008/0171208 A1 | 7/2008 | Buchner | |
| 2009/0123757 A1 | 5/2009 | Pudleiner et al. | |
| 2012/0112133 A1 | 5/2012 | Bahnmuller | |
| 2014/0162911 A1 | 6/2014 | McCrary | |

* cited by examiner

COATED PARTICLES AND METHODS FOR THEIR MANUFACTURE AND USE

FIELD OF THE INVENTION

The present invention relates to coated particles, such as proppants, processes for their preparation and methods of using such coated particles, such as in hydraulic fracturing.

BACKGROUND

Hydraulic fracturing is a process in which an underground geologic formation that is disposed adjacent to a bore hole is fractured by injecting a pressurized material in order to extract a desired substance, such as oil and/or a gas (such as natural gas), from the geologic formation. The injection of the pressurized material creates channels, i.e., fractures, in the geologic formation through which the desired substance may flow to the bore hole and be retrieved. In this process, the material injected into the geologic formation is often a liquid carrying solid particles that are often referred to as a proppant. The proppant migrates into the fractures that are formed and holds them open so that the desired material can flow out of the fracture. A problem that has been encountered in many instances, however, is that the proppant flows back into the bore hole after the pressure is relieved, which allows the fracture to close, thereby reducing the efficiency of the process.

Therefore, in many hydraulic fracturing processes, the proppant is mixed with a tacky resin, such as a polyamide resin, and this mixture is injected into the bore hole. The tacky resin coats the proppant particles and facilitates adhesion of the particles to each other so that when the mixture flows into a fracture, the proppant particles bind together. This makes the proppant more efficient in keeping fractures open after the injection pressure is eliminated, as compared to uncoated proppant particles.

A drawback to such a procedure, however, has been that the tacky resin must be transported to the well site, stored at the well site in storage tanks, and mixed with the proppant at the well head at the time of use. Moreover, the tacky resin tends to stick to equipment, such as mixers and piping. These drawbacks lead to significant capital equipment costs and production inefficiencies.

As a result, it would be desirable to provide improved coated particles that can be used, for example, as a proppant in hydraulic fracturing.

SUMMARY OF THE INVENTION

In some respects, the present invention is directed to coated particles comprising: (a) a substrate particle having a particle size of no more than 3 mesh; and (b) a coating disposed over at least a portion of the particle, wherein the coating comprises a crystalline or semicrystalline polyester/polyurethane having a decrystallization temperature of at least 35° C.

The present invention also relates to, for example, methods for making such coated particles and methods for using such coated particles, such as in hydraulic fracturing a geologic formation.

DETAILED DESCRIPTION OF THE INVENTION

Various embodiments are described and illustrated in this specification to provide an overall understanding of the structure, function, operation, manufacture, and use of the disclosed products and processes. It is understood that the various embodiments described and illustrated in this specification are non-limiting and non-exhaustive. Thus, the invention is not limited by the description of the various non-limiting and non-exhaustive embodiments disclosed in this specification. Rather, the invention is defined solely by the claims. The features and characteristics illustrated and/or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated herein by reference unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference herein to "certain embodiments", "some embodiments", "various non-limiting embodiments," or the like, means that a particular feature or characteristic may be included in an embodiment. Thus, use of such phrases, and similar phrases, in this specification does not necessarily refer to a common embodiment, and may refer to different embodiments. Further, the particular features or characteristics may be combined in any suitable manner in one or more embodiments. Thus, the particular features or characteristics illustrated or described in connection with various embodiments may be combined, in whole or in part, with the features or characteristics of one or more other embodiments without limitation. Such modifications and variations are intended to be included within the scope of the present specification. In this manner, the various embodiments described in this specification are non-limiting and non-exhaustive.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein is intended to include all sub-ranges subsumed within the recited range. For example, a range of "1 to 10" is intended to include all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are inherently described in this specification such that amending to expressly recite any such sub-ranges would comply with the requirements of 35 U.S.C. § 112 and 35 U.S.C. § 132(a).

The grammatical articles "a", "an", and "the", as used herein, are intended to include "at least one" or "one or more", unless otherwise indicated, even if "at least one" or "one or more" is used in certain instances. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As used herein, "polymer" encompasses prepolymers, oligomers and both homopolymers and copolymers; the prefix "poly" in this context referring to two or more. As used herein, the term "molecular weight", when used in reference to a polymer, refers to the number average molecular weight, unless otherwise specified.

As indicated, embodiments of the present invention are directed to coated particles. As used herein, the terms "particle" and "particulate" may be used interchangeably and, in each case, refers to discrete three dimensionally shaped objects. The particles suitable for use in the present invention can have any of a variety of shapes, including, for example, generally spherical or elongated. In certain embodiments, the particles have an aspect ratio of from 1:1 (a perfect sphere) up to 1:100, up to 1:50, up to 1:20, or, in some cases, up to 1:10 or up to 1:5. As used herein, the "aspect ratio" of a particle is the ratio of the length of the shortest dimension of the particle to the length of the longest dimension of the particle.

The coated particles of the present invention comprise a substrate particle. The substrate particle can be made of any of a variety of materials including, for example, organic and inorganic materials. In certain embodiments of the present invention, the substrate particle comprises a material that renders the coated particles of the present invention suitable for use as a proppant in hydraulic fracturing of a geologic formation. As used herein, the term "proppant" refers to particles that are injected into fractures of an underground geologic formation, such as those that may surround a bore hole, such as a bore hole connected with an oil well, water well, gas well, and the like, to support the fracture in an open position in order to allow a desired material, such as oil, water, natural gas, or other material, to flow through the fracture to the bore hole for retrieval.

In some embodiments, the substrate particle has a particle size of no more than 3 mesh (6730 µm), no more than 6 mesh (3360 µm), no more than 10 mesh (2000 µm), no more than 20 mesh (841 µm), no more than 40 mesh (400 µm), or, in some cases, no more than 50 mesh (297 µm), no more than 60 mesh (250 µm), no more than 70 mesh (210 µm), no more than 80 mesh (177 µm), no more than 100 mesh (149 µm), no more than 200 mesh (74 µm), or, in some cases, no more than 400 mesh (37 µm). In some embodiments wherein the substrate particle comprises sand, for example, the particle size is no more than 60 mesh or no more than 40 mesh. As used herein, "mesh" refers to USA Standard Testing screen numbers. As used herein, "particle size" refers to the largest dimension of a discrete individual particle (as opposed to an agglomeration of individual particles).

As indicated, the substrate particle may comprise any of a variety of materials, including organic and inorganic materials. In certain embodiments, the substrate particle comprises an inorganic material, such as a clay, graphite, glass, cenosphere, slag, sand, mineral fiber, and/or ceramic. In certain embodiments, the substrate particle comprises an organic material, such as an organic polymer and/or a naturally occurring organic material.

Certain embodiments of the present invention are directed to coated particles comprising a coating disposed over at least a portion of the particle. In certain embodiments, the coating is a substantially continuous film that covers all or substantially all the surface of the substrate particle. As used herein, "substantially all" means that the coating covers at least 90 percent of the surface of the substrate particle. As will be appreciated, the coated particles of the present invention are distinct from situations in which particles are simply dispersed in a polymer matrix or binder. In certain embodiments, the coated particles of the present invention are characterized as being solid free-flowing particles when they are at a temperature that is below the decrystallization temperature of the crystalline or semicrystalline polyester/polyurethane that is present in the coating on the substrate particle. As used herein, the term "solid free-flowing particles" refers to dried particles that do not significantly stick or adhere to each other so as to form clumps. One way to assess whether coated particles are "solid free-flowing powders" is by determining whether the particles exhibit an angle of repose that is less than 60 degrees when the particles are passed through a 10 mesh sieve.

As indicated, the coated particles of the present invention comprise a coating that comprises a crystalline or semicrystalline polyester/polyurethane having a decrystallization temperature of at least 35° C. As used herein, the term "crystalline or semicrystalline" means that a polyester/polyurethane has a degree of crystallization of 5 to 100%, such as 20 to 100%. As used herein, "crystalline" means that, in the DSC of a polymer, with rising temperature, a maximum is passed through, which is caused by the melting of regular substructures in the polymer. The temperature at which this maximum occurs is referred to herein as the "decrystallization temperature". In the case of passage through a melting-crystallization cycle, the melting enthalpy can be determined from the area of the melting of crystallization peak. In certain embodiments, the polyester/polyurethanes used in the present invention have a melting enthalpy of at least 5 J/g, such as at least 20 J/g, or, in some cases, at least 40 J/g.

As used herein, the term "polyester/polyurethane" refers to polymers that contain a plurality of ester linkages and a plurality of urethane groups in the polymer backbone. As used herein, "polyurethane" also encompasses polyurethane ureas that, in addition to urethane groups, also contain urea groups.

In certain embodiments, the crystalline or semicrystalline polyester/polyurethane has a decrystallization temperature of at least 35° C., such as at least 40° C., at least 42° C., or, in some cases, at least 45° C. and/or no more than 100° C., no more than 60° C., or, in some cases, no more than 52° C.

In certain embodiments, the crystalline or semicrystalline polyester/polyurethane has a glass transition temperature of at least −100° C., such as at least −60° C. and/or no more than −10° C., such as no more than −40° C., when measured by DSC in accordance with DIN 65467 with a heating up rate of 10 K/min.

In certain embodiments, the crystalline or semicrystalline polyester/polyurethane has a weight-average molecular weight (Mw) of at least 20,000 g/mole, such as at least 30,000 g/mole or, in some cases, at least 50,000 g/mole and/or no more than 250,000 g/mole, such as no more than 220,000 g/mole, or, in some cases, no more than 200,000 g/mol. As used herein, the molecular weight of a polymer is determined by means of gel permeation chromatography (GPC/SEC) with dimethylacetamide as the mobile phase.

In certain embodiments, the crystalline or semicrystalline polyester/polyurethane comprises a reaction product of reactants comprising: (a) a di- or poly-functional polymeric polyol with a number average molecular weight of from 400 to 5,000 g/mole and comprising a polyester polyol; and (b) a di- or poly-functional isocyanate component. Furthermore, the polyester/polyurethane may, in some embodiments, be present, i.e., solubilized or dispersed, in an organic solvent-based composition or an aqueous composition when deposited onto the substrate particle. As used herein, the term "aqueous composition" refers to a composition in which the carrier fluid for the polyester/polyurethane comprises predominantly water, although the presence of some volatile organic compounds is not excluded. In certain embodiments of the aqueous composition, water is present in an amount of at least 80% by weight, such as at least 90% by weight, at least 95% by weight, or, in some cases, at least 98% by weight or at least 99% by weight, based on the total weight of the carrier fluid. As used herein, the term "organic solvent-based composition" refers to a composition in which the carrier fluid for the polyester/polyurethane comprises predominantly a volatile organic compound, although the presence of some water is not excluded. In certain embodiments of the organic solvent-based composition, volatile organic compound is present in an amount of at least 80% by weight, such as at least 90% by weight, at least 95% by weight, or, in some cases, at least 98% by weight or at least 99% by weight, based on the total weight of the carrier fluid.

In certain embodiments, the proportions of the individual components are selected so that the composition comprising the crystalline or semicrystalline polyester/polyurethane that is deposited onto the substrate particle has a polymer content of 30 to 60 percent by weight, based on the total weight of the composition. In some of these embodiments, the composition that is deposited onto the substrate particle also has a viscosity at 25° C. (measured as described in the Examples) of 20 to 2,000 cps, such as 40 to 1,000 cps, or, in some cases, 50 to 600 cps.

As indicated, the crystalline or semicrystalline polyester/polyurethane of certain embodiments of the present invention comprises a reaction product of reactants comprising (a) a di- or poly-functional polymeric polyol with a number average molecular weight of from 400 to 6,000 g/mole, such as 400 to 5,000 g/mole, 800 to 3,000 g/mole, or, in some cases, 800 to 2,500 g/mole or 1,500 to 2,500 g/mole and comprising a polyester polyol. As used herein, "poly-functional" means a component that includes three or more of the functional groups being discussed per molecule, such as, in the case of a polyol, a component comprising at least three hydroxyl groups in the molecule, such as three or four hydroxyl groups in the molecule and, in the case of an isocyanate, a component comprising at least three isocyanate groups in the molecule, such as three or four isocyanate groups in the molecule. In some cases, the di- or poly-functional polymeric polyol with a number average molecular weight of from 400 to 6,000 g/mole has a hydroxyl equivalent weight of 200 to 3,000 g/mole, such as 400 to 1,500 g/mole, or, in some cases, 400 to 1,250 g/mole or 750 to 1,250 g/mole.

Polyester polyols suitable for use in component (a) include, for example, linear polyester diols and branched polyester polyols. Suitable polyester diols and polyols include those that can be prepared from aliphatic, cycloaliphatic and/or aromatic di- or polycarboxylic acids, such as succinic acid, methylsuccinic acid, glutaric acid, adipic acid, pimelic acid, suberic acid, azelaic acid, sebacic acid, nonanedicarboxylic acid, decanedicarboxylic acid, terephthalic acid, isophthalic acid, 0-phthalic acid, tetrahydrophthalic acid, hexahydrophthalic acid, cyclohexanedicarboxylic acid, maleic acid, fumaric acid, malonic acid, and/or trimellitic acid, and acid anhydrides, such as o-phthalic anhydride, trimellitic anhydride, and/or succinic anhydride, with polyhydric alcohols, such as ethanediol, di-, tri-, or tetra-ethylene glycol, 1,2-propanediol, di-, tri-, or tetra-propylene glycol, -1,3-propanediol, butanediol-1,4, butanediol-1,3, butanediol-2,3, pentanediol-1,5, hexanediol-1,6, 2,2-dimethyl-1,3-propanediol (neopentyl glycol), 1,4-dihydroxycyclohexane, 1,4-dimethylolcyclohexane, octanediol-1,8, decanediol-1,10, and/or dodecanediol-1,12, optionally with additional use of higher-functionality polyols, such as trimethylolpropane, glycerol and/or pentaerythritol. Useful polyhydric alcohols for preparing the polyester diols and polyols also include cycloaliphatic and/or aromatic di- and polyhydroxyl compounds.

Suitable polyester polyols may also be homo- or copolymers of lactones, which are obtained, for example, by addition of lactones or lactone mixtures, such as butyrolactone, ε-caprolactone, and/or methyl-ε-caprolactone, onto the suitable difunctional and/or higher-functionality starter molecules, for example the low molecular weight polyhydric alcohols mentioned above.

In certain embodiments, the di- or poly-functional polyester-polyol comprises a reaction product of reactants comprising adipic acid and one or more of butanediol-1,4, hexanediol-1,6, and neopentyl glycol.

In certain embodiments, the di- or poly-functional polyester polyol comprises a reaction product of reactants comprising a dicarboxylic acid comprising succinic acid, adipic acid, dodecandoic acid, derivatives thereof, and/or mixtures thereof, employed in an amount of at least 80 mole %, at least 85 mole %, or, in some cases, at least 90 mole %, based on the total amount of all carboxylic acids used to make the polyester polyol. In certain embodiments, the di- or poly-functional polyester polyol comprises a reaction product of reactants comprising a dicarboxylic acid comprising glutaric acid, azelaic acid, 1,4-, 1,3- and/or 1,2-cyclohexanedicarboxylic acid, terephthalic acid, isophthalic acid, derivatives thereof, and/or mixtures thereof, employed in an amount of up to 20 mole %, such as up to 15 mole %, or, in some cases, up to 10 mole %, based on the total amount of all the carboxylic acids used to make the polyester polyol. In certain embodiments, the di- or poly-functional polyester polyol comprises a reaction product of reactants comprising a polyol comprising monoethylene glycol, 1,3-propanediol, butanediol-1,4, pentanediol-1,5, hexanediol-1,6, neopentyl glycol and/or a mixture thereof, employed in an amount of at least 80 mole %, at least 85 mole %, or, in some cases, at least 90 mole %, based on the total amount of all polyols used to make the polyester polyol. In certain embodiments, the di- or poly-functional polyester polyol comprises a reaction product of reactants comprising a polyol comprising diethylene glycol, hydroxypivalic acid neopentyl glycol, cyclohexanedimethanol, pentane-1,2-diol, nonane-1,9-diol, trimethylolpropane, glycerol, pentaerythritol, and/or a mixture thereof, employed in an amount of up to 20 mole %, such as up to 10 mole %, based on the total amount of all the polyols used to make the polyester polyol.

In certain embodiments, the di- or poly-functional polyester polyol comprises: (i) at least 50 percent by weight, such as 60 to 100 percent by weight, 70 to 100 percent by weight, 80 to 100 percent by weight, or, in some cases, 90 to 99 percent by weight, based on the total weight of the di- or poly-functional polyester polyol present in the composition, of a polyester polyol comprising a reaction product of reactants comprising (a) adipic acid (employed in an amount of at least 80 mole %, at least 85 mole %, or, in some cases, at least 90 mole %, based on the total amount of all carboxylic acids used to make the polyester polyol); and (b) butanediol-1,4 (employed in an amount of at least 80 mole %, at least 85 mole %, or, in some cases, at least 90 mole %, based on the total amount of all polyols used to make the polyester polyol); and (ii) up to 50 percent by weight, such as up to 40 percent by weight, up to 30 percent by weight, up to 20 percent by weight, or 1 to 10 percent by weight, based on the total weight of the di- or poly-functional polyester polyol present in the composition, of a polyester polyol comprising a reaction product of reactants comprising: (a) adipic acid (employed in an amount of at least 80 mole %, at least 85 mole %, or, in some cases, at least 90 mole %, based on the total amount of all carboxylic acids used to make the polyester polyol); (b) hexanediol-1,6, (employed in an amount of at least 40 mole %, such as 40 to 80 mole %, or, in some cases, 50 to 70 mole %, based on the total amount of all polyols used to make the polyester polyol) and; (c) neopentyl glycol (employed in an amount of up to 60 mole %, such as 20 to 60 mole %, or, in some cases, 30 to 50 mole %, based on the total amount of all polyols used to make the polyester polyol).

In some embodiments, in addition to the polyester polyol, component (a) may include up to 50% by weight, such as up 40%, or, in some cases, up to 30% by weight, based on the total weight of component (a), of a di- or poly-functional polymeric polyol that is different from the polyester polyol, such as, for example, a polyether polyol and/or a polycarbonate polyol. In some embodiments, however, the polyester/polyurethane is substantially free, or in some cases completely free, of polyether units.

Di- or poly-functional polycarbonate polyols suitable for use in the present invention include those that can be prepared by reacting diols, such as 1,4-butanediol and/or 1,6-hexanediol, with diaryl carbonates, such as diphenyl carbonate, dialkyl carbonates, for example dimethyl carbonate, and/or phosgene.

Di- or poly-functional polyether polyols suitable for use in the present invention include, for example, the polyaddition products of the styrene oxides, of ethylene oxide, of propylene oxide, of tetrahydrofuran, of butylene oxide, of epichlorohydrin, and the co-addition and grafting products thereof, as well as polyether polyols which are obtained by condensation of polyhydric alcohols or mixtures thereof and those obtained by alkoxylation of polyhydric alcohols, or polyfunctional amines and amino alcohols. Polyether polyols suitable for use in component (a) include the homopolymers, copolymers and graft polymers of propylene oxide and of ethylene oxide, which are obtainable by addition of the epoxides onto low molecular weight di- or triols (such as any of those mentioned above as formation components for polyester polyols), or onto higher-functionality low molecular weight polyols, for example pentaerythritol or sugars, or onto water.

As indicated, the crystalline or semicrystalline polyester/polyurethane comprises a reaction product of reactants that comprises (b) a di- or poly-functional isocyanate component. Any desired organic compounds which have at least two free isocyanate groups per molecule can be used including, for example, diisocyanates according to the structure $Y(NCO)_2$ where Y is a divalent aliphatic hydrocarbon radical having 4 to 12 carbon atoms, a divalent cycloaliphatic hydrocarbon radical having 6 to 15 carbon atoms, a divalent aromatic hydrocarbon radical having 6 to 15 carbon atoms or a divalent araliphatic hydrocarbon radical having 7 to 15 carbon atoms. Specific, but non-limiting, examples of such diisocyanates are tetramethylene diisocyanate, methylpentamethylene diisocyanate, hexamethylene diisocyanate ("HU"), dodecamethylene diisocyanate, 1,4-diisocyanatocyclohexane, 1-isocyanato-3,3,5-trimethyl-5-isocyanatomethylcyclohexane ("IPD1"), 4,4'-diisocyanatodicyclohexylmethane, 4,4'-diisocyanatodicyclohexylpropane-(2,2), 1,4-diisocyanatobenzene, 2,4-diisocyanatotoluene, 2,6-diisocyanatotoluene, 4,4'-diisocyanatodiphenylmethane, 2,2'- and 2,4'-diisocyanatodiphenylmethane, tetramethylxylylene diisocyanate, p-xylylene diisocyanate, p-isopropylidene diisocyanate, and mixtures of two or more of these compounds.

Also suitable are higher-functionality polyisocyanates, or modified polyisocyanates, having, for example, carbodiimide groups, allophanate groups, uretdione groups, isocyanurate groups, urethane groups and/or biuret groups.

In some embodiments, the diisocyanate comprises an aliphatic and/or araliphatic diisocyanate such as HDI, 1,4-diisocyanatocyclohexane, 1-isocyanato-3,3,5-trimethyl-5-isocyanatomethylcyclohexane, 4,4'-diisocyanatodicyclohexylmethane and/or 4,4'-diisocyanatodicyclohexylpropane-(2,2).

In certain embodiments, the crystalline or semicrystalline polyester/polyurethane comprises a silane-containing polyester/polyurethane. Thus, in some embodiments, the crystalline or semicrystalline polyester/polyurethane is a reaction product of reactants further comprising (c) an alkoxysilane that, depending on the process used to make the polyester/polyurethane, includes either an isocyanate group or an isocyanate-reactive group, such as a thiol group and/or an aminic group. As used herein, "alkoxysilane" means a compound comprising a silicon atom, an alkoxy group and another organic group, in which the silicon atom is bonded with the organic group by a covalent bond.

For example, it is possible to make the silane-containing polyester/polyurethane by reacting a polyol, such as the polymeric polyol (a) or an OH-functional prepolymer produced by reacting the polymeric polyol (a) with a deficiency of isocyanate component (b), with an alkoxysilane comprising an isocyanate group. Examples of such alkoxysilanes, which are suitable for use in the present invention, include, for example, isocyanate-functional dialkoxysilanes and trialkoxysilanes, such as, isocyanatomethyltrimethoxysilane, isocyanatomethyltriethoxysilane, (isocyanatomethyl)methyldimethoxysilane, (isocyanatomethyl)methyldiethoxysilane, 3-isocyanatopropyltrimethoxysilane, 3-isocyanatopropylmethyldimethoxysilane, 3-isocyanatopropyltriethoxysilane and 3-isocyanatopropylmethyldiethoxysilane.

In this embodiment of the process for the production of the silane-containing polyester/polyurethane suitable for use in the present invention, an OH-functional prepolymer can be produced by reaction of the polymeric polyol (a) with a deficiency of isocyanate component (b), wherein an NCO:OH ratio of 1:1.3 to 1:10, such as 1:1.5 to 1:3, is used.

Both the production of an OH-functional prepolymer and the reaction of the prepolymer with the alkoxysilane comprising an isocyanate group can be accelerated by suitable catalysis. To accelerate the NCO—OH reaction, urethanisation catalysts, such as organotin compounds or amine catalysts, are suitable. Suitable organotin catalysts include, without limitation, dibutyltin diacetate, dibutyltin dilaurate, dibutyltin bisacetoacetonate and tin carboxylates, such as e.g. tin octoate. These tin catalysts can optionally be used in combination with amine catalysts, such as aminosilanes or 1,4-diazabicyclo[2.2.2]octane. The catalyst, where incorporated, is often employed in quantities of 0.001 to 5.0 wt. %, such as 0.001 to 0.1 wt. % and, in some cases, 0.005 to 0.05 wt. %, based on the solids content of the process product.

The urethanisation reaction is often carried out at temperatures of 20 to 200° C., such as 40 to 120° C., or, in some cases, 60 to 100° C. The reaction may be continued until complete conversion of the NCO groups of the isocyanate-containing compound is achieved. The progress of the reaction can be monitored by means of suitable measuring instruments installed in the reaction vessel and/or by means of analyses on samples taken. Appropriate methods include viscosity measurements, measurements of the NCO content, the refractive index and the OH content, gas chromatography (GC), nuclear magnetic resonance (NMR) spectroscopy, infrared (IR) spectroscopy and near-infrared (NIR) spectroscopy. The NCO content of the mixture is often determined by a titrimetric method.

The process may be carried out continuously, e.g. in a static mixer, extruder or kneader, or batchwise, e.g. in a stirred reactor.

Another process for the production of the crystalline or semicrystalline silane-containing polyester/polyurethane used in embodiments of the present invention is by reacting the isocyanate component (b) or an NCO-functional prepolymer produced by reacting the polymeric polyol (a) with an excess of isocyanate component (b) with an alkoxysilane comprising an isocyanate-reactive group, such as an aminic groups or a thiol group. In certain embodiments, the amounts of the components used in the reaction to make such an NCO-functional prepolymer are selected so as to provide an NCO:OH ratio of 1.3:1.0 to 2:1, such as 1.5:1.0 to 2:1. As with the first process, this urethanisation can also be accelerated by catalysis; the temperature ranges of the reaction are also analogous.

In this embodiment, the reaction is continued until complete conversion of the OH groups of the polyols is achieved. The progress of the reaction may be monitored by checking the NCO content and is complete when the appropriate theoretical NCO content is reached. This can be followed by suitable measuring instruments installed in the reaction vessel and/or by means of analyses on samples taken. Appropriate methods viscosity measurements, measurements of the NCO content, the refractive index and the OH content, GC, NMR spectroscopy, IR spectroscopy and NIR spectroscopy. The NCO content of the mixture is often determined by a titrimetric method.

In these methods, an isocyanate component (b) and/or a NCO functional prepolymer is reacted with an isocyanate-reactive alkoxysilane, such as an isocyanate-reactive dialkoxysilane and/or trialkoxysilane, including, for example, an aminic-functional alkoxysilane and/or thiol-functional alkoxysilane, examples of which include, but are not limited to, mono-silanes and bis-silanes, specific examples of which include, but are not limited to, N(β-aminoethyl), γ-aminopropyltrimethoxysilane, bis(trimethoxysilylpropyl)amine, aminopropyltrimethoxysilane, mercaptopropyltrimethoxysilane, aminopropylmethyldimethoxysilane, mercaptopropylmethyldimethoxysilane, aminopropyltriethoxysilane, mercaptopropyltriethoxysilane, aminopropylmethyldiethoxysilane, mercaptopropylmethyldiethoxysilane, am inomethyltrimethoxysilane, aminomethyltriethoxysilane, (aminomethyl)methyldimethoxysilane, (aminomethyl)methyldiethoxysilane, N-butylaminopropyltrimethoxysilane, and/or N-phenylaminopropyltrimethoxysilane.

In certain embodiments, the component (c) is used in an amount of 0.1 to 10 percent by weight, such as 0.2 to 2 percent by weight or, in some cases, 0.5 to 1.5 percent by weight, based on the total weight of the reactants used to make the polyester/polyurethane.

In certain embodiments, the crystalline or semicrystalline polyester/polyurethane comprises a reaction product of reactants further comprising (d) a di- or poly-functional polyol with a molecular weight of from 62 to 399 g/mol. Examples of component (d) are polymers, such as polyethers, polyesters, polycarbonates, polylactones and/or polyamides. Also suitable for use as a component (d) are polyhydric, including dihydric, alcohols mentioned earlier with respect to the preparation of the polyester polyols and include, for example, monomeric polyols such as ethanediol, diethylene glycol, 1,2-propanediol, dipropylene glycol, 1,3-propanediol, 1,4-butanediol, 1,3-butanediol, 2,3-butanediol, 1,5-pentanediol and 1,6-hexanediol.

In certain embodiments, the component (d) is used in an amount of 0.1 to 10 percent by weight, such as 0.1 to 2 percent by weight or, in some cases, 0.1 to 1 percent by weight, based on the total weight of the reactants used to make the polyester/polyurethane.

In certain embodiments, particularly those in which the crystalline or semicrystalline polyester/polyurethane is sought to be present as a stable dispersion in an aqueous composition, the crystalline or semicrystalline polyester/polyurethane comprises a reaction product of reactants further comprising (e) a dispersant compound that contains ionic groups or potentially ionic groups, which may be either cationic or anionic in nature, and which has at least one isocyanate-reactive group, such as a hydroxyl, thiol, and/or aminic group. Suitable cationic and anionic groups include, for example, sulfonium groups, ammonium groups, phosphonium groups, carboxylate groups, sulfonate groups, phosphonate groups, or the corresponding non-ionic acid groups (i.e., potentially ionic groups) that can be converted by deprotonation (i.e., salt formation) into these groups.

Suitable ionic or potentially ionic compounds include, for example, mono- and di-hydroxycarboxylic acids; mono- and di-aminocarboxylic acids; mono- and di-hydroxysulfonic acids; mono- and di-aminosulfonic acids; mono- and di-hydroxyphosphonic acids; mono- and di-aminophosphonic acids; and their salts, including combinations thereof. Examples of suitable specific compounds include, without limitation, dimethylolpropionic acid, dimethylolbutyric acid, hydroxypivalic acid; N-(2-aminoethyl)-p-alanine; 2-(2-aminoethylamino) ethanesulfonic acid; ethylenediamepropyl- or butyl-sulfonic acid; 1,2- or 1,3-propylenediamine-β-ethylsulfonic acid; citric acid; glycolic acid; lactic acid; glycine; alanine; taurine; lysine; 3,5-diaminobenzoic acid; an adduct of IPDI and acrylic acid and its alkali metal and/or ammonium salts; an adduct of sodium bisulfite with but-2-ene-1,4-diol; polyethersulfonate; and the propoxylated adduct of 2-butenediol and $NaHSC_3$.

Suitable compounds for use in component (e) also include other 2,2-bis(hydroxymethyl)alkane-carboxylic acids, such as dimethylolacetic acid and 2,2-dimethylolpentanoic acid, dihydroxysuccinic acid, Michael adducts of acrylic acid with amines such as isophoronediamine or hexamethylenediamine, or mixtures of such acids and/or dimethylolpropionic acid and/or hydroxypivalic acid, sulfonic acid diols optionally comprising ether groups, for example, the compounds described in U.S. Pat. No. 4,108,814 at col. 3, ln. 13 to col. 5, ln. 2, the cited portion of which being incorporated herein by reference.

Dispersant compounds reactive towards isocyanate groups may contain hydrophilic ether groups that impart aqueous dispersability to macromolecules covalently incorporating the dispersant compounds. Suitable compounds include, for example, polyether polyols and polyether polyamines. Exemplary compounds include, but are not limited to, alcohol-derived polyethylene glycols, polypropylene glycols, copolymers thereof, and monomethyl ethers thereof.

Suitable compounds for use in component (e) containing sulfonate or carboxylate groups are, for example, diamino compounds or dihydroxy compounds which have sulfonate and/or carboxylate groups, such as, for example, the sodium, lithium, potassium and tert-amine salts of N-(2-aminoethyl)-2-aminoethanesulfonic acid, of N-(3-aminopropyl)-2-aminoethanesulfonic acid, of N-(3-aminopropyl)-3-aminopropanesulfonic acid, of N-(2-aminoethyl)-3-aminopropanesulfonic acid, of the analogous carboxylic acids, of dimethylolpropionic acid, of dimethylolbutyric acid or of the reaction products of a Michael addition of 1 mole of diamine, such as e.g. 1,2-ethanediamine or isophoronediamine, with 2 mole of acrylic acid or maleic acid.

The acids are often employed directly in their salt form as sulfonate or carboxylate. However, it is also possible for a proportion or the entire neutralizing agent needed for the salt formation to be first added during or after the preparation of the polyurethanes. Tert-amines which are suitable for the salt formation are e.g. triethylamine, dimethylcyclohexylamine and/or ethyldiisopropylamine. Other amines can also be employed for the salt formation, such as e.g. ammonia, diethanolamine, triethanolamine, dimethylethanolamine, methyldiethanolamine, aminomethylpropanol and also mixtures thereof. These amines are usually added only after the isocyanate groups have largely reacted. It is also possible to employ other neutralizing agents, such as e.g. sodium, potassium, lithium or calcium hydroxide.

In certain embodiments, the component (e) is used in an amount of 0 percent by weight to 20 percent by weight, such as 0.1 percent by weight to 20 percent by weight, 0.5 percent by weight to 20 percent by weight or, in some cases, 1 percent by weight to 15 percent by weight, based on the total weight of the reactants used to make the polyester/polyurethane.

In certain embodiments, the crystalline or semicrystalline polyester/polyurethane comprises a reaction product of reactants further comprising a component (f) comprising an aminic chain extender, such as monoamino and/or diamino compounds. Chain extenders in the context of the invention also include monoamines, which lead to chain termination, and mixtures thereof.

Examples of suitable monoamine chain extenders are aliphatic and/or alicyclic, primary and/or secondary monoamines such as ethylamine, diethylamine, the isomeric propyl- and butylamines, higher linear-aliphatic monoamines and cycloaliphatic monoamines such as cyclohexylamine. Further examples are amino alcohols, i.e. compounds which contain amino and hydroxyl groups in one molecule, for example ethanolamine, N-methylethanolamine, diethanolamine or 2-propanolamine. Further examples are monoamino compounds which additionally bear sulphonic acid and/or carboxy groups, for example taurine, glycine or alanine.

Examples of suitable diamino chain extenders are 1,2-ethanediamine, 1,6-hexamethylenediamine, 1-amino-3,3,5-trimethyl-5-aminomethylcyclohexane (isophoronediamine), piperazine, 1,4-diaminocyclohexane or bis(4-aminocyclohexyl)methane. In addition, adipic dihydrazides, hydrazines or hydrazine hydrates are useful. It is also possible to use polyamines such as diethylenetriamine in place of a diamino compound as a formation component.

In certain embodiments, component (f) is used in an amount of 0.1 to 10 percent by weight, such as 0.1 to 2 percent by weight or, in some cases, 0.1 to 1 percent by weight, based on the total weight of the reactants used to make the polyester/polyurethane.

In certain embodiments, the crystalline or semicrystalline polyester/polyurethane comprises a reaction product of reactants further comprising a component (g) comprising other isocyanate-reactive compounds, such as aliphatic, cycloaliphatic or aromatic monoalcohols having 2 to 22 carbon atoms, such as ethanol, butanol, hexanol, cyclohexanol, isobutanol, benzyl alcohol, stearyl alcohol and 2-ethylethanol; mono- or difunctional polyethers which are based on ethylene oxide polymers or ethylene oxide/propylene oxide copolymers started on alcohols or amines and have a hydrophilizing action, such as Polyether LB 25 (Bayer MaterialScience AG; Germany) or MPEG 750: methoxypolyethylene glycol, molecular weight 750 g/mole (Pluriol® 750, BASF AG, Germany); blocking agents which are usual for isocyanate groups and can be split off again at elevated temperature, such as butanone oxime, dimethylpyrazole, caprolactam, malonates, triazole, dimethyltriazole, tert-butylbenzylamine and cyclopentanone carboxyethyl ester; and unsaturated compounds containing groups accessible for polymerization reactions, such as hydroxyethyl acrylate, hydroxyethyl methacrylate, hydroxybutyl acrylate, hydroxybutyl methacrylate, hydroxypropyl acrylate, hydroxypropyl methacrylate, pentaerythritol trisacrylate and hydroxy-functional reaction products of monoepoxides, bisepoxides and/or polyepoxides with (meth)acrylic acid.

In some embodiments, the sum of the weight percentages of (a) through (g), or any subset thereof, such as the sum of (a) through (f), totals 100%.

The crystalline or semicrystalline polyester/polyurethane can be prepared by any of a variety of processes, such as emulsifier/shear-force, acetone, prepolymer-mixing, meltemulsification, ketimine, and spontaneous solids-dispersing processes, such as is described in *Methoden der Organischen Chemie*, Houben-Weyl, 4$^{th}$ ed., Vol. E20/Part 2, p. 1682, Georg Thieme Verlag, Stuttgart, 1987.

In some embodiments, such as those in which the polyester/polyurethane is provided as a stable dispersion in an aqueous composition, the acetone process is used to prepare the polyester/polyurethane. To this end, prepolymers of components A and B, and if appropriate any of C, D, E, and/or G, are dissolved in acetone and chain-extended with component F. After dispersion with water, the acetone is distilled off. The acetone process is described in U.S. Pat. No. 3,479,310 and GB 1,076,788. Other suitable processes for making aqueous polymeric dispersions are described in DE-OS 2 725 589 and U.S. Pat. Nos. 4,269,748, 4,192,937, 4,292,226, and 3,756,992.

Aqueous dispersions of crystalline or semicrystalline polyester/polyurethanes that are suitable for use in the present invention are commercially available and include, for example, Dispercoll® U 53, U54, U 56 and U 8755, available from Bayer MaterialScience LLC, Pittsburgh, Pa.

In addition to the crystalline or semicrystalline polyester/polyurethane, the composition may include any desired additives or auxiliaries. Suitable additives and auxiliaries include, but are not limited to, fillers, wetting agents, thickeners, fungicides, tackifying resins, surfactants, and colorants.

In certain embodiments, the composition includes an alkoxysilane which may be used in addition to, or in lieu of, any alkoxysilane used in the production of the polyester/polyurethane, as described earlier. Suitable alkoxysilanes include, without limitation, the alkoxysilanes mentioned earlier with respect to the production of the polyester/polyurethane. In some embodiments, the alkoxysilane comprises an aminosilane, including mono-silanes and bis-silanes, specific examples of which include N(β-aminoethyl), γ-aminopropyltrimethoxy-silane γ-aminopropyltriethoxysilane, and/or bis(trimethoxysilyl-propyl)amine.

In certain embodiments, the alkoxysilane is included in the composition in an amount of 0.1 to 10 percent by weight, such as 0.1 to 5 percent by weight, or, 0.2 to 2 percent by weight, based on the total weight of the composition.

The coated particles of certain embodiments of the present invention can be prepared by any of a variety of processes, including batch, semi-continuous, or continuous processes. Suitable methods of making the coated particles are described in the Examples.

In certain embodiments, the resulting coated particles are classified in a sieve (such as a vibration sieve) to collect coated particles having the desired particle size. In certain embodiments, the desired particle size of the coated particle in the range of no more than 3 mesh (6730 µm), no more than 6 mesh (3360 µm), no more than 10 mesh (2000 µm), no more than 20 mesh (841 µm), no more than 40 mesh (400 µm), or, in some cases, no more than 50 mesh (297 µm) and/or at least 400 mesh (37 µm), at least 200 mesh (37 µm), at least 100 mesh (149 µm), at least 80 mesh (177 µm), at least 70 mesh (210 µm), at least 60 mesh (250 µm), or, in some cases, at least 50 mesh (297 µm). In some embodiments wherein the substrate particle comprises sand, for example, the desired particle size of the coated particle is from 10 to 60 mesh, such as 10 to 20 mesh, 20 to 40 mesh, or, in some cases, 40 to 60 mesh.

As will be appreciated, therefore, the present invention is also directed to methods for making coated particles. These methods comprise: (a) mixing substrate particles with an aqueous composition or organic solvent-based composition comprising: (i) a carrier fluid, and (ii) a crystalline or semicrystalline polyester/polyurethane having a decrystallization temperature of at least 35° C.; and (b) removing the carrier fluid from the mixture to provide solid free-flowing particles.

The coated particles described herein can be used in a variety of applications including, for example, use as a component of a coating, adhesive, or sealant composition, in which the coated particles are dispersed in a binder resin, such as any binder resin known to those skilled in the art of such compositions.

In certain embodiments, however, the coated particles of the present invention are thought to be suitable for use in hydraulic fracturing a geologic formation. In these embodiments, the coated particles may be combined with a carrier fluid, such as water and/or a hydrocarbon, and the mixture injected at elevated pressure into a well bore to an underground geologic formation. When the pressure in the formation resulting from the injection exceeds the strength of the formation, a fracture is formed and the coated particles, i.e., proppant, are placed in the formation in an effort to maintain the fracture in a propped position when the injection pressure is released. Upon ceasing the injection of fluid, it is desired that the proppant forms a pack that serves to hold open the fractures, thereby providing a highly conductive channel through which a desired material, such as water, oil, or gas (including natural gas) can flow to the well bore for retrieval.

In certain embodiments, therefore, the coated particles are used in a method of forming a proppant composition that includes suspending the coated particles described herein in a carrier fluid to form a suspension and injecting the suspension into an underground geologic formation.

The coated particles described herein can be injected as the sole proppant or as a partial replacement for an existing proppant. For example, if desired, the coated particles described herein may comprises 1 to 99 percent by weight, such as 10 to 90 percent by weight, or, in some cases, 10 to 50 percent by weight, based on the total weight of the proppant present in the composition that is injected into the well bore. In some embodiments, an uncoated proppant is first placed in a well, and thereafter a proppant of the coated particles described herein is placed in the fracture nearest to the wellbore or fracture openings.

The coated particles of the present invention are presently thought to provide several advantages, particularly in the context of hydraulic fracturing. For example, since the coated particles are free-flowing at ambient temperature the particles would not tend to stick to equipment, such as piping, at such conditions, but when exposed to elevated temperatures and pressures used in hydraulic fracturing the polymer would become tacky, thereby causing substrate particles to be adhered to one another, enabling efficient filling of cracks in a geologic formation.

As will be appreciated by the foregoing description, the present invention is directed, in certain embodiments, to coated particles comprising: (a) a substrate particle having a particle size of no more than 3 mesh; and (b) a coating disposed over at least a portion of the particle, wherein the coating comprises a crystalline or semicrystalline polyester/polyurethane having a decrystallization temperature of at least 35° C.

In certain embodiments, the present invention is directed to coated particles of the previous paragraph, wherein the substrate particle comprises sand.

In certain embodiments, the present invention is directed to coated particles of any of the previous two paragraphs, wherein the coated particle is a solid free-flowing particle at a temperature that is below the decrystallization temperature of the crystalline or semicrystalline polyester/polyurethane.

In certain embodiments, the present invention is directed to coated particles of any of the previous three paragraphs, wherein the crystalline or semicrystalline polyester/polyurethane has a decrystallization temperature of 35° C. to 100° C., 40° C. to 60° C., or 45° C. to 52° C.

In certain embodiments, the present invention is directed to coated particles of any of the previous four paragraphs, wherein the crystalline or semicrystalline polyester/polyurethane has a weight-average molecular weight Mw of 20,000 to 250,000 g/mole, 30,000 g/mole to 220,000 g/mole, or 50,000 to 200,000 g/mole.

In certain embodiments, the present invention is directed to coated particles of any of the previous five paragraphs, wherein the crystalline or semicrystalline polyester/polyurethane comprises a reaction product of reactants comprising: (a) a di- or poly-functional polymeric polyol with a number average molecular weight of from 400 to 5,000 g/mole, such as 800 to 3,000 g/mole, or, in some cases, 800 to 2,500 g/mole or 1,500 to 2,500 g/mole and comprising a polyester polyol; and (b) a di- or poly-functional isocyanate component.

In certain embodiments, the present invention is directed to coated particles of any of the previous six paragraphs, wherein the di- or poly-functional polymeric polyol comprises a reaction product of reactants comprising: (a) a dicarboxylic acid comprising succinic acid, adipic acid, dodecandoic acid, one or more derivatives thereof, and/or a mixture thereof, employed in an amount of at least 80 mole %, based on the total amount of all carboxylic acid used to make the polymeric polyol; and (b) a polyol comprising monoethylene glycol, 1,3-propanediol, butanediol-1,4, pentanediol-1,5, hexanediol-1,6, neopentyl glycol and/or a mixture thereof, employed in an amount of at least 80 mole %, based on the total amount of all polyol used to make the polymeric polyol.

In certain embodiments, the present invention is directed to coated particles of any of the previous seven paragraphs, wherein the di- or poly-functional polymeric polyol comprises: (i) at least 50 percent by weight, based on the total weight of the di- or poly-functional polyester-polyol in the composition, of a polyester polyol comprising a reaction product of reactants comprising: (A) at least 80 mole % adipic acid, based on the total amount of all carboxylic acids used to make the polyester polyol, and (B) at least 80 mole % butanediol-1,4, based on the total amount of all polyols used to make the polyester polyol; and (ii) up to 50 percent by weight, based on the total weight of the di- or poly-functional polyester-polyol in the composition, of a polyester polyol comprising a reaction product of reactants comprising: (A) at least 80 mole % adipic acid, based on the total amount of all carboxylic acids used to make the polyester polyol), (B) at least 40 mole % hexanediol-1,6, based on the total amount of all polyols used to make the polyester polyol; and (C) up to 60 mole % 2,2-dimethyl-1,3-propanediol, based on the total amount of all polyols used to make the polyester polyol.

In certain embodiments, the present invention is directed to coated particles of any of the previous eight paragraphs, wherein the crystalline or semicrystalline polyester/polyurethane comprises a silane-containing polyester/polyurethane.

In certain embodiments, the present invention is directed to coated particles of the previous paragraphs, wherein the reactants further comprise: (c) an alkoxysilane comprising either an isocyanate group or an isocyanate-reactive group.

In certain embodiments, the present invention is directed to coated particles of any of the previous ten paragraphs, wherein the reactants further comprise at least one of: (d) a di- or poly-functional polyol with a molecular weight of from 62 to 399 g/mole; (e) a component comprising sulfonate and/or carboxylate groups and which furthermore has at least one isocyanate-reactive group; (f) an aminic chain extender; and (g) an isocyanate-reactive compound comprising an aliphatic, cycloaliphatic or aromatic monoalcohols having 2 to 22 C atoms.

In certain embodiments, the present invention is directed to coated particles of the previous paragraph, wherein the reactants comprise (e) and (f).

In certain embodiments, the present invention is directed to coated particles of any of the previous twelve paragraphs, wherein the coated particle has a particle size of no more than 10 mesh and at least 100 mesh, no more than 20 mesh and at least 80 mesh, or no more than 40 mesh and at least 60 mesh.

In certain embodiments, the present invention is directed to methods of using a coated particle of any of the previous thirteen paragraphs, comprising injecting the coated particle into a well bore to an underground geologic formation.

In certain embodiments, the present invention is directed to methods of using a coated particle of any of the previous fourteen paragraphs, wherein the coated particle is combined with a carrier fluid prior to the injection.

In certain embodiments, the present invention is directed to methods for making a coated particle of any of the previous fifteen paragraphs, comprising: (a) mixing a substrate particle with an aqueous composition or organic solvent-based composition comprising: (i) a carrier fluid, and (ii) a crystalline or semicrystalline polyester/polyurethane having a decrystallization temperature of at least 35° C.; and (b) removing the carrier fluid from the mixture to provide coated particles that are solid free-flowing particle at a temperature that is below the decrystallization temperature of the crystalline or semicrystalline polyester/polyurethane.

In certain embodiments, the present invention is directed to a method for making a coated particle of the previous paragraph, wherein the wherein the substrate particle comprises sand.

In certain embodiments, the present invention is directed to a method for making a coated particle of any of the previous two paragraphs, wherein the coated particle is a solid free-flowing particle at a temperature that is below the decrystallization temperature of the crystalline or semicrystalline polyester/polyurethane.

In certain embodiments, the present invention is directed to a method for making a coated particle of any of the previous three paragraphs, wherein the composition further comprises an alkoxysilane, such as an aminosilane.

In certain embodiments, the present invention is directed to a method for making a coated particle of any of the previous four paragraphs, wherein the crystalline or semicrystalline polyester/polyurethane has a decrystallization temperature of 40° C. to 60° C.

In certain embodiments, the present invention is directed to a method for making a coated particle of any of the previous five paragraphs, wherein the crystalline or semicrystalline polyester/polyurethane comprises a reaction product of reactants comprising: (a) a di- or poly-functional polymeric polyol with a number average molecular weight of from 400 to 5,000 g/mole and comprising a polyester polyol; and (b) a di- or poly-functional isocyanate component.

In certain embodiments, the present invention is directed to a method for making a coated particle of any of the previous six paragraphs, wherein the di- or poly-functional polymeric polyol comprises a reaction product of reactants comprising: (a) a dicarboxylic acid comprising succinic acid, adipic acid, dodecandoic acid, one or more derivatives thereof, and/or a mixture thereof, employed in an amount of at least 80 mole %, based on the total amount of all carboxylic acid used to make the polymeric polyol; and (b) a polyol comprising monoethylene glycol, 1,3-propanediol, butanediol-1,4, pentanediol-1,5, hexanediol-1,6, neopentyl glycol and/or a mixture thereof, employed in an amount of at least 80 mole %, based on the total amount of all polyol used to make the polymeric polyol.

In certain embodiments, the present invention is directed to a method for making a coated particle of any of the previous seven paragraphs, wherein the di- or poly-functional polymeric polyol comprises: (i) at least 50 percent by weight, based on the total weight of the di- or poly-functional polyester-polyol in the composition, of a polyester polyol comprising a reaction product of reactants comprising: (A) at least 80 mole % adipic acid, based on the total amount of all carboxylic acids used to make the polyester polyol, and (B) at least 80 mole % butanediol-1,4, based on the total amount of all polyols used to make the polyester polyol; and (ii) up to 50 percent by weight, based on the total weight of the di- or poly-functional polyester-polyol in the composition, of a polyester polyol comprising a reaction product of reactants comprising: (A) at least 80 mole % adipic acid, based on the total amount of all carboxylic acids used to make the polyester polyol), (B) at least 40 mole % hexanediol-1,6, based on the total amount of all polyols used to make the polyester polyol; and (C) up to 60 mole % 2,2-dimethyl-1,3-propanediol, based on the total amount of all polyols used to make the polyester polyol Illustrating the invention are the following examples that do not limit the invention to their details. All parts and percentages in the examples, as well as throughout the specification, are by weight unless otherwise indicated.

EXAMPLES

Examples 1A-1C

Coated sand particles were made using the ingredients and amounts listed in Table 1. In each Example, the polymer dispersion was added to the sand in an 8 oz. jar and mixed in using a tongue blade. After mixing, the material was poured out onto release paper and allowed to dry overnight. During the drying process, the mixture was crumbled to prevent the formation of large sand agglomerates. The process resulted in free-flowing coated sand particles.

TABLE 1

| Material | Example 1A | Example 1B | Example 1C |
|---|---|---|---|
| Sand[1] | 350 grams | 350 grams | 350 grams |
| Dispercoll ® C2372[2] | 50 grams | — | — |
| Dispercoll ® C XP 2717[3] | — | 50 grams | — |
| Dispercoll ® U 53[4] | — | — | 50 grams |

[1]Each example was prepared using all-purpose sand and 20/40 (20-40 mesh) sand.
[2]An aqueous dispersion of poly-2-chlorobutadiene-1,3 having a decrystallization temperature of less than 35° C., from Bayer MaterialScience LLC.
[3]An aqueous dispersion of poly-2-chlorobutadiene-1,3 having a decrystallization temperature of about 55° C., from Bayer MaterialScience LLC.
[4]An aqueous dispersion of an anionic polyester/polyurethane having a decrystallization temperature of about 55° C., from Bayer MaterialScience LLC.

For each of Examples 1A-1C, the coated particles were heated in an oven to 65° C. The heated coated sand particles were then packed into a 1¼ inch inner diameter×3 inch long pipe. The pipe was then placed on a heated platen press (70° C.) and the particles were pressed at 16000 psi for two hours. The pipe was then cooled to room temperature and the compacted particles were removed from the pipe. The coated particles maintained the cylindrical shape. The coated particles of Example 1C had to be broken apart to get them out of the pipe.

Example 2A-2C

Coated sand particles were made using the ingredients and amounts listed in Table 2 using the procedure described above in Examples 1A-1C.

TABLE 2

| Material | Example 2A | Example 2B | Example 2C |
|---|---|---|---|
| Sand[1] | 200 grams | 200 grams | 200 grams |
| Dispercoll ® C2372[2] | 20 grams | — | — |
| Dispercoll ® C XP 2717[3] | — | 20 grams | — |
| Dispercoll ® U 53[4] | — | — | 20 grams |

The coated sand of each of Examples 2A-2C was mixed with 500 grams of water in a 1000 ml round bottom flask. The flask was placed in a heating mantle set at 85° C. and the mixture was stirred at 200 rpm. At a temperature of 56° C., the mixture using the coated sand of Example 2C had formed an agglomerated ball of sand, showing that the coating was successful at bonding sand particles together, whereas the coating separated from the sand in the mixtures of Examples 2A and 2B. At a temperature of 66° C., the sand ball formed from the mixture using the coated sand of Example 2C was falling apart and by 82° C. the coating had separated from the sand and was stuck to the mixing blade.

Examples 3A-3F

Coating formulations were prepared using the ingredients and amounts listed in Table 3.

TABLE 3

| Material | Example 3A | Example 3B | Example 3C |
|---|---|---|---|
| Dispercoll ® U 54 | 200 grams | 200 grams | 200 grams |
| Silquest ® A-1120[5] | 1 gram | 2 grams | 2 grams |
| BYK ® 346[6] | — | — | 1 gram |

[5]N(beta-aminoethyl) gamma-aminopropyltrimethoxy-silane, Momentive Performance Materials Inc.
[6]Silicone surfactant, BYK Chemie Coated sand particles were made using the ingredients and amounts listed in Table 4 using the procedure described above in Examples 1A-1C.

TABLE 4

| Material | Example 3D | Example 3E | Example 3F |
|---|---|---|---|
| 20/40 Sand | 200 grams | 200 grams | 200 grams |
| Example 3A | 20 grams | — | — |
| Example 3B | — | 20 grams | — |
| Example 3C | — | — | 20 grams |

For each of Examples 3D-3F, sand particles were coated with the coating formulations of Examples 3A, 3B and 3C using the procedure described in Example 1A-1C. The coated sand was mixed with water and heated in the same manner as described in Examples 2A-2C. In each of Examples 3D-3F, the material consolidated in the flask when heated and the coating remained adhered to the sand through the cooling process, though Example 3F exhibited a more uniform dispersion of the coating throughout the sand.

Examples 4A-4C

Example 4A

A polyol blend consisting of 280.1 grams of a 2250 MW butanediol adipate polyester polyol, 26.5 grams of a 1700 MW hexanediol neopentyl adipate polyester polyol, and 1.4 grams of 1,4-butanediol were reacted with a mixture of 23.5 grams of hexamethylene diisocyanate (Desmodur® H, Bayer MaterialScience LLC) and 15.6 grams of isophorone diisocyanate (Desmodur® I, Bayer MaterialScience LLC). The prepolymer was dissolved in 482.8 grams of acetone. 8.9 grams of the sodium salt of ethylene-diamine-2-ethansulfonic acid and 3.0 grams of gamma-aminopropyltriethoxysilane (Silquest® A 1100, Momentive Performance Materials Inc.) were reacted with the prepolymer in acetone. Water (364.8 grams) was added followed by distillation of acetone to yield a polyurethane dispersion.

The dispersion was stabilized with 21.3 grams of a fatty alcohol/ethylene oxide emulsifier and 4.9 grams of a biocide solution (containing Kathon™ LX, The Dow Chemical Company).

The dispersion had 52.41% final solids (Mettler Hr73), a mean particle size of 0.383 micron (Horiba Particle Size Analyzer), a pH of 7.20, and a viscosity of 158 mPas at 25° C. (Brookfield viscometer RVT, spindle #2, 60 rpm).

Example 4B

A polyol blend consisting of 280.1 grams of a 2250 MW butanediol adipate polyester polyol, 26.5 grams of a 1700 MW hexanediol neopentyl adipate polyester polyol, and 1.4 grams of 1,4-butanediol were reacted with a mixture of 23.5 grams of hexamethylene diisocyanate (Desmodur® H, Bayer MaterialScience LLC, Pittsburgh, Pa.) and 15.6 isophorone diisocyanate (Desmodur® I, Bayer MaterialScience LLC, Pittsburgh, Pa.). The prepolymer was dissolved in 482.8 grams of acetone. 8.9 grams of the sodium salt of ethylene diamine-2-ethan-sulfonic acid and 3.0 grams of a secondary aminofunctional bis-silane (Silquest® A 1170, Momentive Performance Materials Inc.) were reacted with the prepolymer in acetone. Water (364.8 grams) was added followed by distillation of acetone to yield a polyurethane dispersion.

The dispersion was stabilized with 21.3 grams of a fatty alcohol/ethylene oxide emulsifier and 4.9 grams of a biocide solution (containing Kathon™ LX, The Dow Chemical Company).

The dispersion had 51.06% final solids (Mettler Hr73), a mean particle size of 0.247 micron (Horiba Particle Size Analyzer), a pH of 7.18, and a viscosity of 166 mPas at 25° C. (Brookfield viscometer RVT, spindle #2, 60 rpm).

Example 4C

A polyol blend consisting of 280.1 grams of a 2250 MW butanediol adipate polyester polyol, 26.5 grams of a 1700 MW hexanediol neopentyl adipate polyester polyol, and 1.4 grams of 1,4-butanediol were reacted with a mixture of 23.5 grams of hexamethylene diisocyanate (Desmodur® H, Bayer MaterialScience LLC, Pittsburgh, Pa.) and 15.6 grams of isophorone diisocyanate (Desmodur® I, Bayer MaterialScience LLC, Pittsburgh, Pa.). The prepolymer was dissolved in 482.8 grams of acetone. 8.9 grams of the sodium salt of ethylene diamine-2-ethan-sulfonic acid and 6.0 grams of gamma-aminopropyltriethoxysilane (Silquest® A 1100, Momentive Performance Materials Inc.) were reacted with the prepolymer in acetone. Water (364.8 grams) was added followed by distillation of acetone to yield a polyurethane dispersion.

The dispersion was stabilized with 21.3 grams of a fatty alcohol/ethylene oxide emulsifier and 4.9 grams of a biocide solution (containing Kathon™ LX, The Dow Chemical Company).

The dispersion had 52.06% final solids (Mettler Hr73), a mean particle size of 0.255 micron (Horiba Particle Size Analyzer), a pH of 7.11, and a viscosity of 150 mPas at 25° C. (Brookfield viscometer RVT, spindle #2, 60 rpm).

Examples 4D-4I

Coating formulations were prepared using the ingredients and amounts listed in Table 5.

TABLE 5

| Material | Example 4D | Example 4E | Example 4F |
|---|---|---|---|
| Dispersion of Example 4A | 200 grams | — | — |
| Dispersion of Example 4B | — | 200 grams | — |
| Dispersion of Example 4C | — | — | 200 grams |
| BYK ® 346[6] | 1 gram | 1 gram | 1 gram |

Coated sand particles were made using the ingredients and amounts listed in Table 6 using the procedure described above in Examples 1A-1C.

TABLE 6

| Material | Example 4G | Example 4H | Example 4I |
|---|---|---|---|
| 20/40 Sand | 200 grams | 200 grams | 200 grams |
| Example 4D | 20 grams | — | — |
| Example 4E | — | 20 grams | — |
| Example 4F | — | — | 20 grams |

For each of Examples 4G-4H, sand particles were coated with the coating formulations of Examples 4D, 4E and 4F using the procedure described in Example 1A-1C. The coated sand was mixed with water and heated in the same manner as described in Examples 2A-2C. The coated sand of Example 4H held the sand together though it fell apart with the slightest touch. The coated sand of Examples 4G and 4I held the sand together much better, showing similar results to that of Example 3F. The coated sand of Example 4I was harder to remove from the flask than that of Example 4G.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:
1. A coated particle comprising:
   a substrate particle having a particle size of no more than 3 mesh; and
   a coating disposed over at least a portion of the particle, wherein the coating comprises a crystalline or semicrystalline polyester/polyurethane that is a reaction product of reactants comprising:
   (a) a di- or poly-functional polymeric polyol with a number average molecular weight of from 400 to 5,000 g/mole and comprising a polyester polyol;

(b) a di- or poly-functional isocyanate component; and (c) an alkoxysilane comprising either an isocyanate group or an isocyanate-reactive group, and wherein the reaction product has a decrystallization temperature of 40° C. to 60° C.

2. The coated particle of claim 1, wherein the substrate particle comprises sand.

3. The coated particle of claim 1, wherein the coated particle is a solid free-flowing particle at a temperature that is below the decrystallization temperature of the crystalline or semicrystalline polyester/polyurethane.

4. The coating particle of claim 1, wherein the crystalline or semicrystalline polyester/polyurethane has a decrystallization temperature of 45° C. to 52° C.

5. The coated particle of claim 1, wherein the polyester/polyurethane has a weight-average molecular weight of 20,000 to 250,000 g/mole.

6. The coated particle of claim 1, wherein the di- or poly-functional polymeric polyol comprises a reaction product of reactants comprising:

(a) a dicarboxylic acid comprising succinic acid, adipic acid, dodecandoic acid, one or more derivatives thereof, or a mixture thereof, employed in an amount of at least 80 mole %, based on the total amount of all carboxylic acid used to make the polymeric polyol; and (b) a polyol comprising monoethylene glycol, 1,3-propanediol, butanediol-1,4, pentanediol-1,5, hexanediol-1,6, neopentyl glycol, or a mixture thereof, employed in an amount of at least 80 mole %, based on the total amount of all polyol used to make the polymeric polyol.

7. The coated particle of claim 1, wherein the di- or poly-functional polymeric polyol comprises:

(i) at least 50 percent by weight, based on the total weight of the di- or poly-functional polyester-polyol in the composition, of a polyester polyol comprising a reaction product of reactants comprising:

(A) at least 80 mole % adipic acid, based on the total amount of all carboxylic acids used to make the polyester polyol, and (B) at least 80 mole % butanediol-1,4, based on the total amount of all polyols used to make the polyester polyol; and (ii) up to 50 percent by weight, based on the total weight of the di- or poly-functional polyester-polyol in the composition, of a polyester polyol comprising a reaction product of reactants comprising:

(A) at least 80 mole % adipic acid, based on the total amount of all carboxylic acids used to make the polyester polyol, (B) at least 40 mole % hexanediol-1,6, based on the total amount of all polyols used to make the polyester polyol; and (C) up to 60 mole % 2,2-dimethyl-1,3-propanediol, based on the total amount of all polyols used to make the polyester polyol.

8. The coated particle of claim 1, wherein the reactants further comprise at least one of:

(d) a di- or poly-functional polyol with a molecular weight of from 62 to 399 g/mole;

(e) a component comprising sulfonate and/or carboxylate groups and which furthermore has at least one isocyanate-reactive group;

(f) an aminic chain extender; and (g) an isocyanate-reactive compound comprising an aliphatic, cycloaliphatic or aromatic monoalcohols having 2 to 22 carbon atoms.

9. The coated particle of claim 8, wherein the reactants comprise (e) and (f).

10. The coated particle of claim 1, wherein the coated particle has a particle size of 10 to 100 mesh.

* * * * *